Sept. 8, 1970    B. C. MATHEWS    3,527,233
MOUNTING MEANS FOR THRESHING CYLINDER AND HEADER SPOUT
Filed Feb. 14, 1968    4 Sheets-Sheet 1
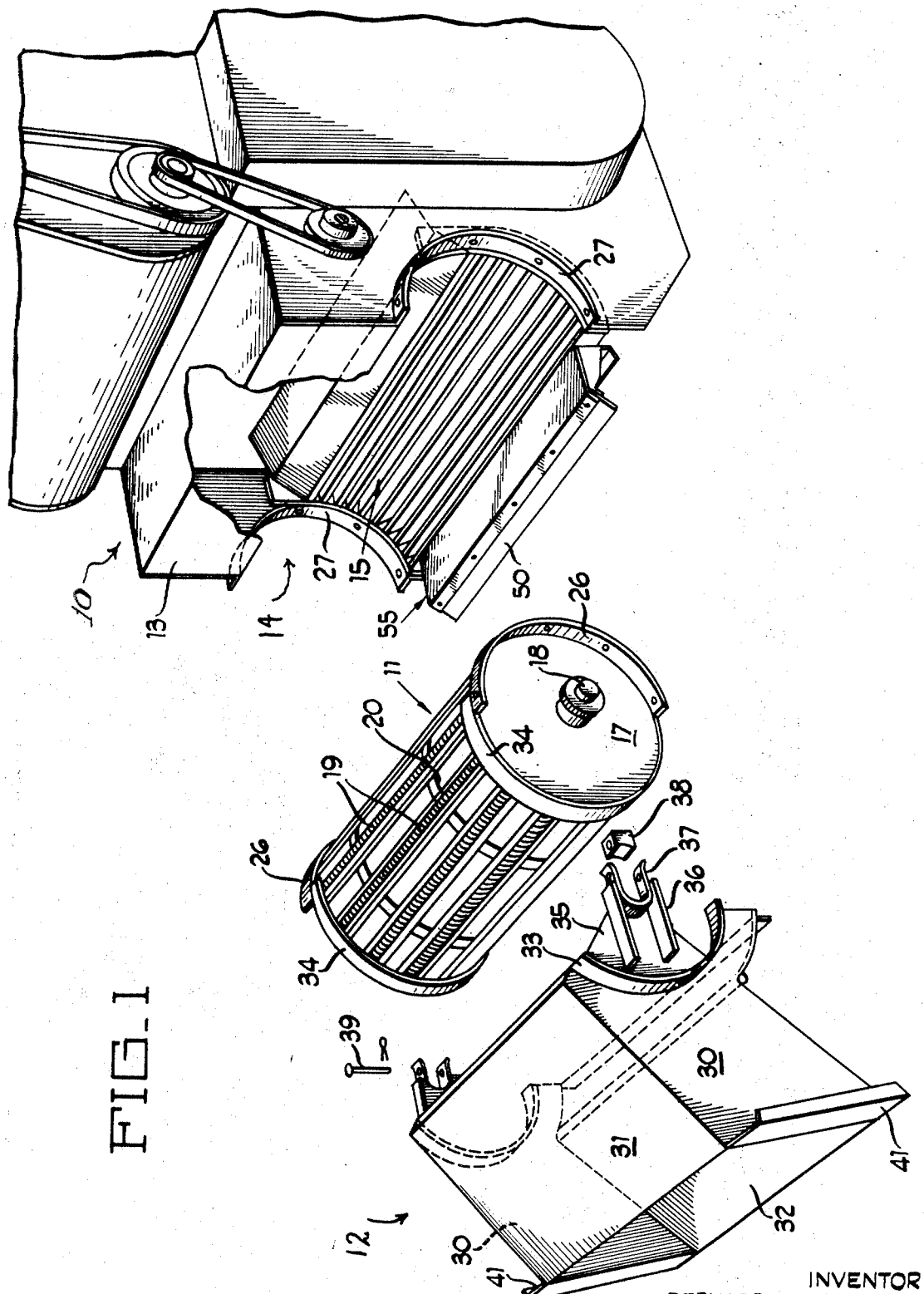
INVENTOR
BERNARD C. MATHEWS
BY Zabel, Baker, York, Jones & Dithmar
ATTORNEYS

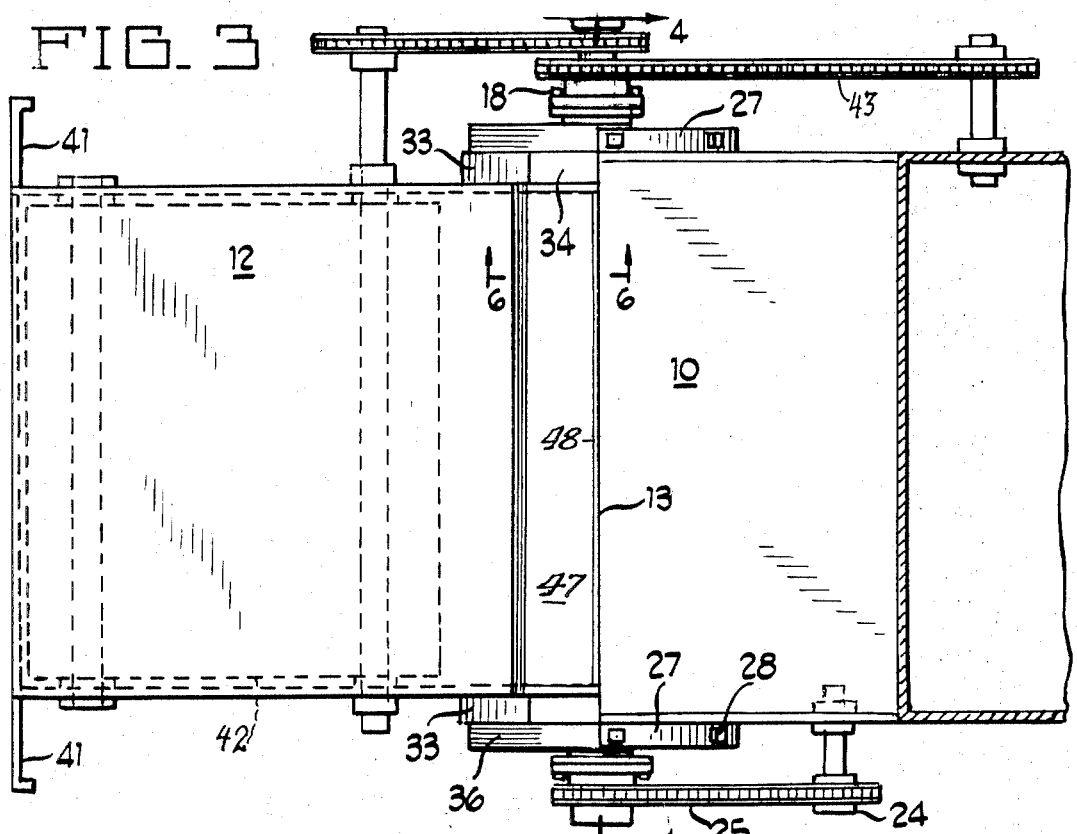
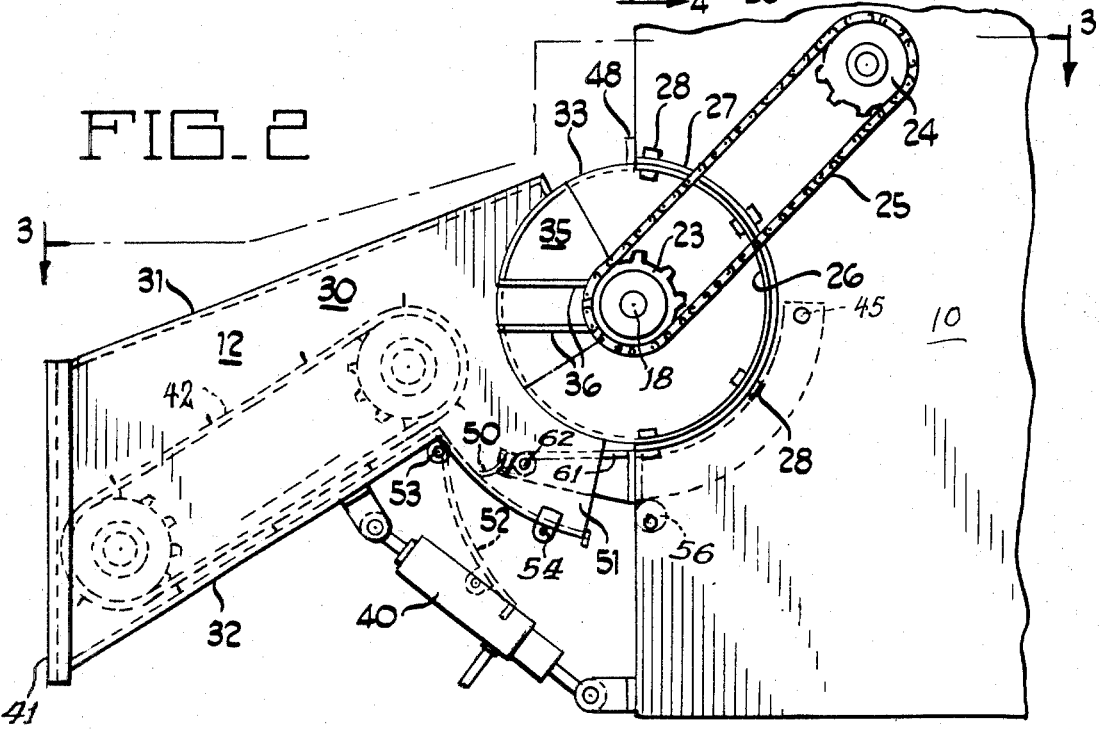

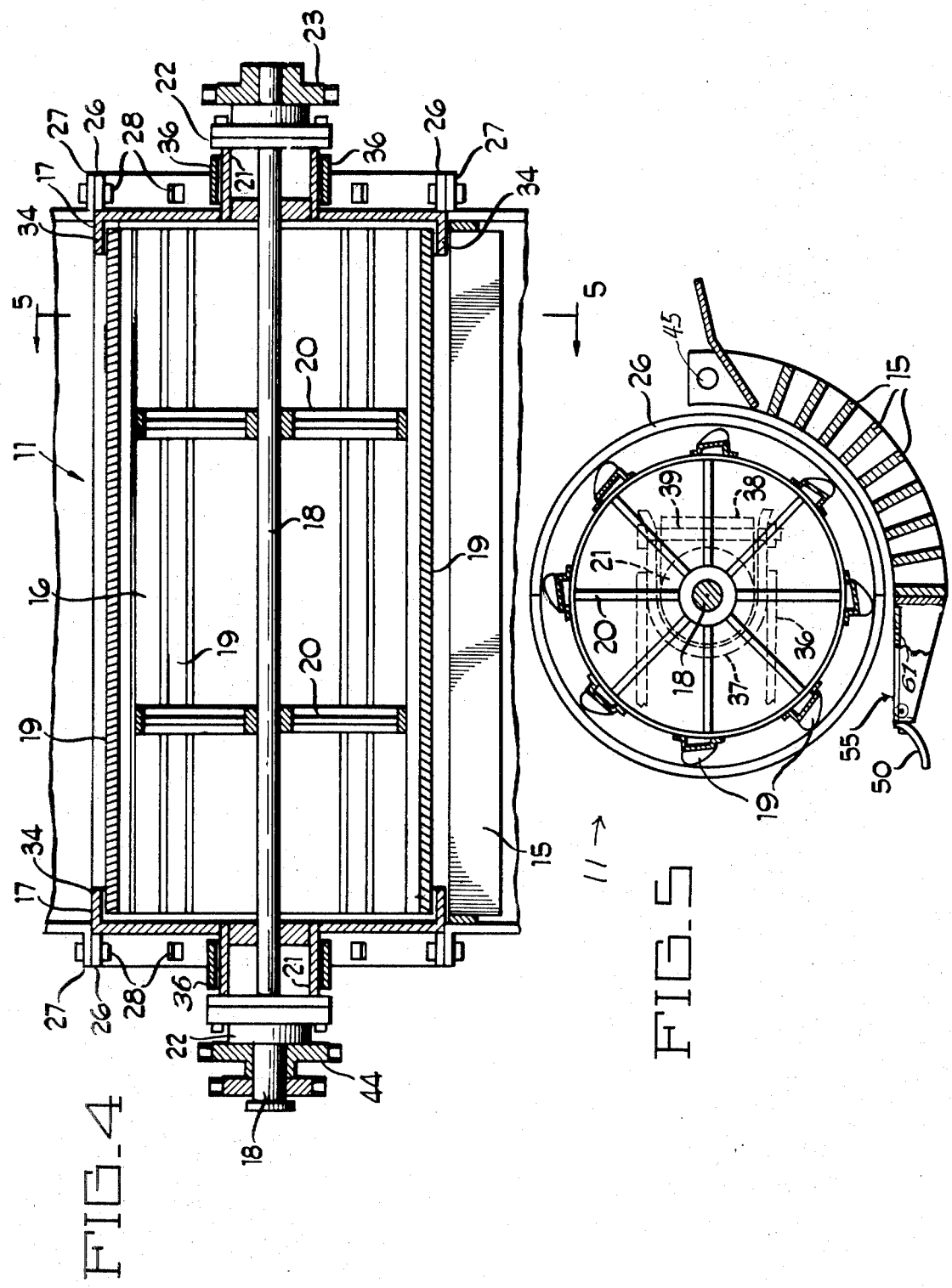

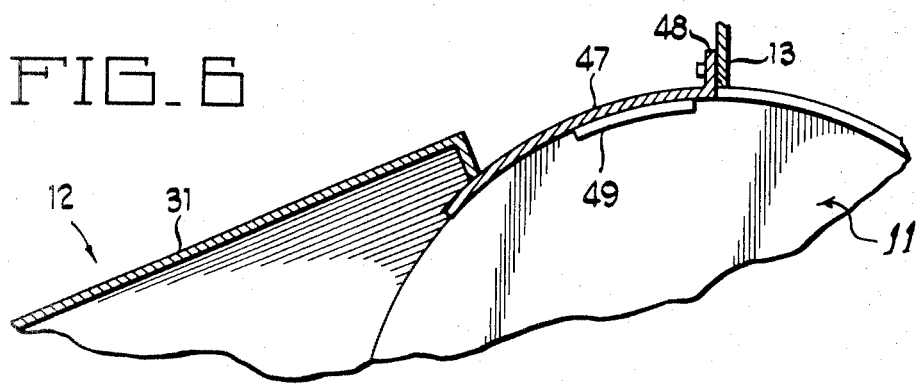
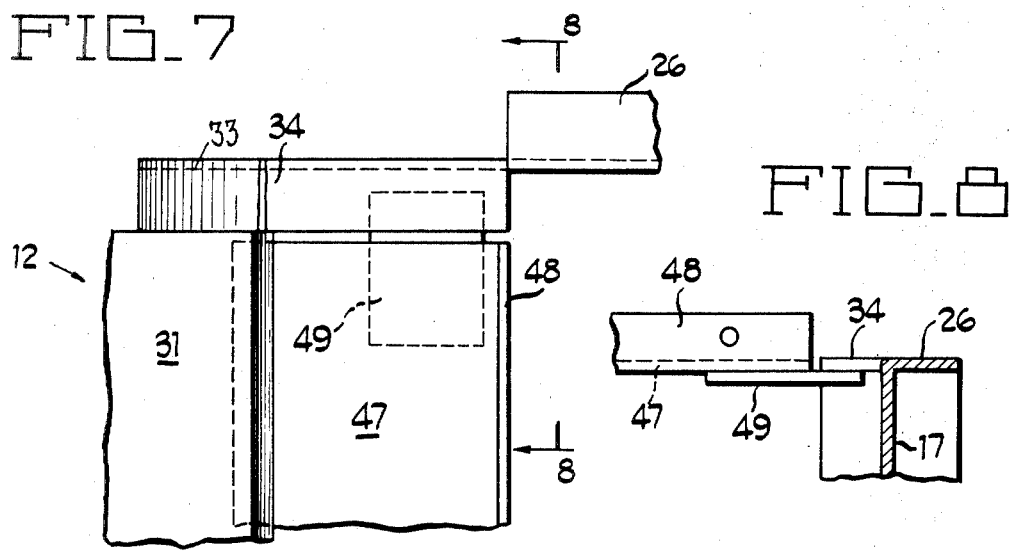
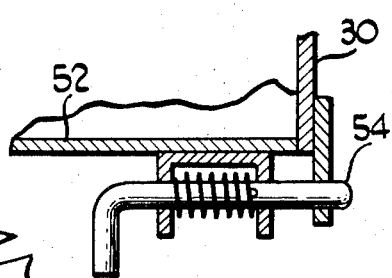
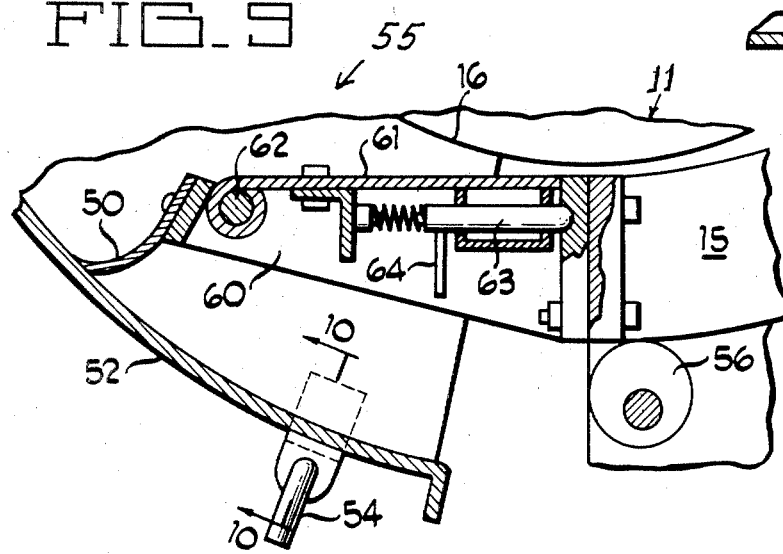

United States Patent Office 3,527,233
Patented Sept. 8, 1970

---

3,527,233
MOUNTING MEANS FOR THRESHING CYLINDER AND HEADER SPOUT
Bernard C. Mathews, Box 70, Crystal Lake, Ill. 60014
Filed Feb. 14, 1968, Ser. No. 705,464
Int. Cl. A01f *12/28*
U.S. Cl. 130—27
17 Claims

ABSTRACT OF THE DISCLOSURE

The threshing cylinder of a combine is located half in and half out of the front wall of the combine enclosure. The concave is located in the enclosure. The cylinder is a part of a cylinder assembly which includes circular end walls mounting the bearings for the cylinder shaft. The end walls of the cylinder assembly are removably bolted to semicylindrical flanges on the enclosure. A forwardly extending header spout is pivotally and removably mounted on said end walls, concentric to the cylinder. A hydraulic cylinder extending between the header spout and the enclosure provides angular adjustment of the header spout. The joints between the header spout and said end walls are made by overlapping arcuate flanges concentric with the pivot to permit said angular adjustment. A guide plate having a flexible sealing strip bridges the gap between the header spout and the concave. The flexible sealing strip bears against a wall portion of the header spout which is concentric to the pivot to permit said angular adjustment. The guide plate is hinged, and held in place by a detent so as to eject stones entrapped between it and the cylinder.

---

This invention relates to an improved mounting for the threshing cylinder of a combine.

It becomes necessary to remove and replace threshing cylinders for sharpening or repair, or sometimes for substitution since different threshing cylinders are used on different types of crop.

In the usual combine, the harvesting head is attached directly to the structure of the combine, and the threshing cylinder is mounted transversely within the confines of the combine enclosure in which the separating and grain cleaning mechanism is located. Suitable crop feeding means leads from the harvesting head to the bite of the threshing cylinder and the concave.

In order to remove the threshing cylinder from the combine, it is generally necessary to pull the bearing units from the shaft, then withdraw the shaft in its axial direction so that the cylinder can then be removed from the combine in a direction perpendicular to the shaft axis. The foregoing series of operations is time consuming, and additionally requires bearing pulling equipment and cylinder lifting mechanism, the cylinder weighing approximately 500 pounds.

According to my invention, I provide a cylinder assembly which includes end wall members between which the cylinder is rotatably supported. The end wall members are removably secured to the structure of the combine enclosure so that the cylinder assembly as a whole may be removed from the enclosure without pulling the bearings from the shaft.

This enables one to replace or sharpen the rasp bars without removing the cylinder shaft from the bearings, or enables rapid substitution of cylinders by substituting a complete cylinder assembly.

In the usual combine construction, the harvester head is adjustably mounted on the structure of the combine so that the elevation of the harvesting head with respect to the ground may be regulated. The crop feeding means between the harvesting head and the thresher cylinder comprises a conveyor which is enclosed in a duct sometimes referred to as the "header spout."

According to my invention, the header spout is pivotally mounted on the end walls of the cylinder assembly, and the harvesting head is mounted on the front end of the header spout, the end walls of the thresher cylinder and the header spout thus serving as structural members for the purpose of supporting the harvesting head.

Another object of my invention is to provide an improved front end arrangement for a combine which not only facilitates cylinder replacement or repair, but also facilitates substitution of a whole front end assembly, comprising the harvester head, the header spout and the threshing cylinder.

Other objects, features and advantages of my invention will become apparent as the description proceeds.

With reference now to the drawings in which like reference numerals designate like parts;

FIG. 1 is an exploded perspective view showing a portion of the combine enclosure, the cylinder assembly, and the header spout;

FIG. 2 is an elevation of the parts in assembled relationship;

FIG. 3 is a plan view of FIG. 2;

FIG. 4 is a vertical section of the cylinder assembly taken along line 4—4 of FIG. 3;

FIG. 5 is a vertical section taken along line 5—5 of FIG. 4;

FIG. 6 is a vertical fragmentary section taken along line 6—6 of FIG. 3 showing the filler strip above the cylinder assembly, the cylinder being omitted for clarity;

FIG. 7 is a plan view of FIG. 6, the front wall being omitted;

FIG. 8 is a fragmentary sectional detail taken along line 8—8 of FIG. 7;

FIG. 9 is an enlarged vertical section showing the guide plate and the flexible seal; and FIG. 10 is a fragmentary section taken along line 10—10 of FIG. 9.

In FIG. 1 the enclosure of the combine is designated generally by the reference numeral 10, the cylinder assembly by the reference numeral 11 and the header spout by the reference numeral 12.

The front wall 13 of the combine enclosure 10 is provided with an opening exposing a semicylindrical recess 14 defined by flanges 27. The "concave" 15 is mounted in the lower portion of the recess 14.

The cylinder assembly 11 comprises the cylinder proper 16 and flanged end walls 17. The cylinder 16 comprises a shaft 18 and a number of transverse threshing bars 19 supported from the shaft 18 by suitable spiders 20, as shown in FIGS. 4 and 5. The threshing bars 19, shown here as rasp bars for example, cooperate with the transverse bars of the concave 15 in the customary fashion to effect threshing. Suitable means are provided for adjusting the clearance between the concave 15 and the rasp bars 19.

The end walls 17 include a tubular extension forming a pivot 21 the outer end of which supports a bearing 22 for the shaft 18. A drive sprocket 23 is secured to the shaft 18 and is driven from a power sprocket 24 on the combine enclosure 10 by means of a suitable chain 25.

Each end wall 17 has on its rear half an outwardly extending mounting flange 26 which registers with a corresponding support flange 27 formed on the combine enclosure 10. The cylinder assembly 11 is mounted on the combine enclosure by suitable bolts 28 extending through aligned holes in the flanges 26 and 27. When the cylinder assembly is thus bolted to the combine enclosure, and the chain 25 trained around the sprockets 23 and 24, the cylinder 16 will be driven in the usual fashion for threshing.

The header spout 12 is a hollow rectangular structure having an open front, side walls 30, a top wall 31, and a bottom wall 32. The rear portions of the side walls 30 are provided with an outwardly extending arcuate joint flange 33 which overlies an inwardly extending arcuate joint flange 34 on the end walls 17. A triangular plate 35 extends rearwardly from the outer edges of the joint flange 33 to form a support for yoke mounting strips 36 which extend rearwardly and embrace a U-shaped yoke member 37. The latter is welded to the mounting strips. The pivot 21 is received within the yoke 37 and confined therein by a closure block 38 secured by a bolt 39 (FIG. 1). The pivot 21 is preferably concentric to the shaft 18.

The arcuate joint flanges 33 and 34 are concentric to the pivot 21 and provide a sliding joint between the side walls 30 and the end wall member 17 which permits angular adjustment of the header spout 12. These joint flanges overlap the end portions of the threshing bars 19 to prevent entry of the cut crop into the space between the ends of the bars 19 and the end walls 17, and consequent tangling around the shaft 18.

However, this overlap is not necessary at the front half of the cylinder. Therefore by turning the flanges 26 outwardly, it is possible to provide an arrangement by means of which the threshing bars 19 may be removed from the spiders 20 without removing the end walls 17 from the cylinder 16.

The header spout is adapted to support at its front end a suitable harvesting head, not shown, which may be bolted to the flanges 41. A hydraulic cylinder 40, attached at one end to the enclosure 10, serves to adjust the angle of the header spout 12 with respect to the enclosure 10, and hence the elevation of the harvesting head above the ground.

A slat conveyor 42 transports material from the harvester head through the header spout 12 and to the bite between the threshing cylinder 16 and the concave 15 in the usual fashion. The slat conveyor 42 is driven by a chain and sprocket mechanism 43 from a suitable drive shaft on the combine enclosure 10. The arrangement, as shown in FIGS. 3 and 4, includes a double idler sprocket 44 rotatably mounted on the extended shaft 18, and hence is concentric to the pivots 21 so that no adjustment of the chain is necessary when the elevation of the header spout 12 is adjusted during operation.

The clearance between the rasp bars 19 and the concave 15 may be adjusted to accommodate different types of grain. The upper end of the concave is mounted on pivots 45 and the lower end is supported by cams 56 (FIGS. 2 and 9) to provide the desired adjustment.

Guide means 55 extends forwardly from the concave 15 and into a throat 51 on the header spout 12, as shown in FIGS. 1 and 2. The guide means 55 guides the cut crop in its movement from the conveyor 42 to the space between the cylinder 16 and the concave 15. A flexible sealing strip 50, of stiff canvas for example, is mounted at the front end of the guide means 55 and engages a transverse curved wall 52 of the throat 50. The wall 52 is mounted by a hinge 53 on the front edge of the bottom wall 32 of the header spout 12 so that the header spout 12 may be positioned with respect to the combine before the strip 50 and the wall 52 are brought into engagement with each other. This flexible connection between the parts permits adjustment of the concave 15. A latch (FIGS. 9 and 10) maintains the curved wall 52 in its normal position in which it is concentric to the pivot 21. Thus, the engagement between the sealing strip 50 and the wall 52 will be maintained for all adjusted positions of the header spout 12, and a completely enclosed path provided for the cut crop.

Suitable means, shown in FIGS. 6 to 8, are provided for closing the gap between the top wall 31 of the header spout 12 and the front wall 13 of the enclosure.

This closure means comprises an arcuate filler strip 47 having a flange 48 which is bolted to the front wall 13. The filler strip 47 extends the full width of the cylinder assembly 11 and underlies the bent down front edge of the top wall 31. Support lugs 49, welded to the inturned joint flanges 34 of the end walls 17, underlie the side edges of the filler strip, and are thin enough to clear the threshing bars 19.

As shown in FIG. 9, the guide means 55 comprises end brackets 60 which support a hinged plate 61 by means of a hinge 62. The hinged plate 61 is maintained in its normal horizontal position shown, in which it is flush with the upper surface of the concave 15, by a spring biased detent 63. Thus the guide means 55 also serves as a rock ejector.

If a stone is picked up by the harvesting head and conveyed up to the guide 55, the cylinder 16 will force it down against the hinged plate 61 and the detent 63 will release, thus permitting the hinged plate to swing downwardly and eject the stone. A handle 64 facilitates resetting of the detent 63 when the hinged plate is moved back to its normal position.

The foregoing arrangement provides a simple and convenient method of converting a combine from one crop to the other, such as from grain to corn, or vice versa. For instance, in the case of wheat, a wheat head is mounted on the front end of the header spout 12, and the threshing cylinder is a rasp bar type, as shown in FIG. 1. In order to convert, the header spout 12 is lowered by the hydraulic cylinder 40 until the harvester head, not shown, rests on the ground. Then the chains 25 and 43 and the hydraulic cylinder 40 are removed. In order to detach the whole front end, all that is necessary is to remove the bolts 28 which secure the flanges 26 and 27 to each other. Then the combine is backed away from the cylinder assembly 11, and moved up into engagement with a properly placed front end unit for corn, for example. This unit would comprise another cylinder assembly with a different type of threshing bar, a header spout the same as header spout 12, and a corn head. In some instances the different threshing cylinder will require a special concave. In the present arrangement the concave is readily accessible for removal and substitution.

When one wishes only to sharpen the rasp bars, the front end unit may be separated as above outlined, and the rasp bars can be sharpened while they are being supported by the header spout and the harvesting head. In some instances, it may be necessary to block up the header spout, but in other instances, the weight of the harvesting head is sufficient to maintain the cylinder in its elevated position. Similarly, a rasp bar may be replaced without removing the cylinder assembly from the header spout.

It is desired to substitute cylinders on a particular front end unit, after the combine has been separated from the front end unit as above described, the chain between the idler sprocket 44 and the slat conveyor 42 is first removed. Then the bolts 39 (FIG. 1) are removed from the yoke 37 and the blocks 38 removed. Then a wheeled jack may be brought up under the cylinder and the same may be withdrawn rearwardly, the pivots 21 sliding out of the yokes 37.

All of the foregoing removals, substitutions or replacements can be accomplished without pulling the bearing units from the shaft. It is only when it becomes necessary to remove the end wall member 17 from the cylinder 16 that bearing pulling equipment is necessary. However, as indicated above, for many types of cylinder repair, such as bar replacement, or rasp sharpening, this can be done not only without pulling the bearings, but also without even removing the cylinder assembly from the header spout.

To reassemble the cylinder with the header spout, or to connect the front end unit to the combine, the above operations are performed in the reverse order. However, when moving the combine up to the front end unit, it is desirable to first swing down the curved wall 52 of the throat 51 so that the flexible strip 50 is not bent under by the relative movement of the parts.

Although only a preferred embodiment of my invention is shown herein, it will be understood that various modifications and changes may be made in the construction shown without departing from the scope of my invention, as pointed out by the appended claims.

I claim:

1. In a combine comprising an enclosure, a threshing cylinder disposed at least partially within said enclosure, a shaft for said cylinder, and crop feeding means located forwardly of said threshing cylinder, the improvement comprising end wall members having bearings receiving said shaft for rotatably supporting said cylinder, and means for removably mounting said end wall members on said enclosure so that said end wall members and said cylinder may be removed as a unit from said enclosure, said crop feeding means being mounted on said end wall members.

2. A combine as claimed in claim 1 in which said crop feeding means includes a header spout overlying the front of said threshing cylinder, and pivot means on said end wall members for mounting said header spout for angular adjustment.

3. A combine as claimed in claim 2 having additional means connecting said header spout and said enclosure for adjusting the angle of said header spout with respect to said enclosure so that the elevation of the front end of said header spout above the ground may be adjusted.

4. A combine as claimed in claim 3 in which said header spout includes means for supporting a harvesting head.

5. A combine comprising an enclosure having a front wall with an opening formed therein, and having a pair of support flanges behind said opening defining a transverse recess, a cylinder assembly located partially within said recess with a portion of said cylinder assembly projecting forwardly of said front wall and comprising a threshing cylinder and end walls each supporting a bearing, said cylinder having a shaft journaled in said bearings, said end wall members each having a mounting flange removably secured to said support flanges so that said cylinder assembly may be removed as a unit, and a concave located in the lower portion of said recess beneath said cylinder and cooperating therewith.

6. A combine as claimed in claim 5 including a guide plate extending forwardly from said concave said guide plate being hingedly supported at its front end, the rear end of said guide plate normally being substantially flush with the upper front surface of said concave, and releasable means for maintaining said guide plate in its normal position and being operable to permit downwardly swinging movement of said guide plate when a rock is entrapped between said cylinder and said guide plate.

7. A combine comprising an enclosure, a cylinder assembly comprising a threshing cylinder and end wall members each supporting a bearing, said cylinder having a shaft journaled in said bearings, means for removably mounting said end wall members on said enclosure so that said cylinder assembly may be removed as a unit, said end wall members including pivot means extending laterally from the outer surface of each and including arcuate joint flanges concentric with said pivot means, a header spout mounted on said pivot means for angular adjustment and having arcuate joint flanges overlying said end wall joint flanges to permit said angular adjustment, and additional means connecting said header spout and said enclosure for effecting said angular adjustment, said end wall joint flanges extending inwardly and overlapping the ends of said cylinder.

8. A combine as claimed in claim 7 in which said header spout joint flanges extend outwardly.

9. A combine comprising an enclosure, a cylinder assembly comprising a threshing cylinder and end wall members each supporting a bearing, said cylinder having a shaft journaled in said bearings, means for removably mounting said end wall members on said enclosure so that said cylinder assembly may be removed as a unit, said end wall members including pivot means extending laterally from the outer surface of each, and including arcuate joint flanges concentric with said pivot means, a header spout mounted on said pivot means for angular adjustment and having arcuate joint flanges overlying said end wall joint flanges to permit said angular adjustment, additional means connecting said header spout and said enclosure for effecting said angular adjustment, said header spout including yoke means embracing said pivot means, a block member confining said pivot within said yoke means, and means for removably securing said block member to said yoke means.

10. A combine comprising an enclosure, a cylinder assembly comprising a threshing cylinder and end wall members each supporting a bearing, said cylinder having a shaft journaled in said bearings, means for removably mounting said end wall members on said enclosure so that said cylinder assembly may be removed as a unit, said end wall members including pivot means extending laterally from the outer surface of each, and including arcuate joint flanges concentric with said pivot means, a header spout mounted on said pivot means for angular adjustment and having arcuate joint flanges overlying said end wall joint flanges to permit said angular adjustment, and additional means connecting said header spout and said enclosure for effecting said angular adjustment, sadi pivot means comprising a tubular member, and said bearings being supported by said tubular member and concentric therewith.

11. A combine comprising an enclosure having a front wall with an opening formed therein, and having a pair of support flanges behind said opening defining a transverse recess, a cylinder assembly comprising a threshing cylinder and end wall members each supporting a bearing, said cylinder having a shaft journaled in said bearings, said end wall members each having a mounting flange removably secured to said support flanges so that said cylinder assembly may be removed as a unit, said end wall members also including pivot means extending laterally from the outer surface of each, a header spout mounted on said pivot means for angular adjustment, and additional means connecting said header spout and said enclosure for effecting angular adjustment, said cylinder assembly being located partially within said recess with a portion of said cylinder assembly projecting forwardly of said front wall, said pivot means being concentric with said bearings, and said header spout being located forwardly of said front wall.

12. A combine comprising an enclosure having a front wall with an opening formed therein, and having a pair of support flanges behind said opening defining a transverse recess, a cylinder assembly comprising a threshing cylinder and end wall members each supporting a bearing, said cylinder having a shaft journaled in said bearings, said end wall members each having a mounting flange removably secured to said support flanges so that said cylinder assembly may be removed as a unit, said end wall members also including pivot means extending laterally from the outer surface of each, a header spout mounted on said pivot means for angular adjustment, and additional means connecting said header spout and said enclosure for effecting angular adjustment, said support flanges and said mounting flanges being arcuate and defining a semicylindrical recess.

13. A combine as claimed in claim 12 in which said end wall mounting flanges are outwardly extending so as to provide access to the full width of said cylinder when said cylinder assembly is removed from said enclosure.

14. A combine comprising an enclosure having a front wall with an opening formed therein, and having a pair of support flanges behind said opening defining a transverse recess, a cylinder assembly comprising a threshing cylinder and end wall members each supporting a bearing, said cylinder having a shaft journaled in said bearings, said end wall members each having a mounting flange removably secured to said support flanges so that said cylinder assembly may be removed as a unit, said end wall members also including pivot means extending laterally from the outer surface of each, a header spout mounted on said pivot means for angular adjustment, additional means connecting said header spout and said enclosure for effecting angular adjustment, a concave located in the lower portion of said recess for cooperation with said threshing cylinder, said header spout including a throat portion extending downwardly and rearwardly from the rear end thereof, said throat portion including a transverse curved wall spaced from said cylinder, guide plate means extending forwardly from said concave toward said transverse curved wall, and a flexible seal mounted on the front end of said guide plate means and engaging said transverse curved wall.

15. A combine as claimed in claim 14 in which said transverse curved wall is concentric with said pivot means so that the engagement of said flexible seal and said transverse curved wall will be maintained for different angular adjustments of said header spout.

16. A combine as claimed in claim 14 in which said transverse curved wall is hingedly mounted at its upper end, and latch means maintaining said transverse wall in a normal position in which it is engaged by said flexible seal.

17. A combine as claimed in claim 14 in which said guide plate means includes a hinge for supporting said guide plate at its front end, the rear end of said guide plate being normally flush with the upper surface of said concave, and detent means for maintaining said guide plate in its normal position, and being operable to permit downwardly swinging movement of said guide plate when a rock is entrapped between said cylinder and said guide plate.

References Cited

UNITED STATES PATENTS

| | | | |
|---|---|---|---|
| 2,305,159 | 12/1942 | Heckman et al. | 130—27 |
| 2,644,284 | 7/1953 | Oberholtz et al. | 56—21 |
| 2,743,728 | 5/1956 | Carlson | 130—27 |
| 2,787,106 | 4/1957 | Bish | 56—2 XR |
| 3,425,194 | 2/1969 | Stott et al. | 56—2 |

ANTONIO F. GUIDA, Primary Examiner

U.S. Cl. X.R.

56—2, 21